United States Patent
Zhao et al.

(10) Patent No.: US 10,575,273 B2
(45) Date of Patent: Feb. 25, 2020

(54) REGISTRATION OF DEVICES IN SECURE DOMAIN

(71) Applicant: Intel Corporation, Santa Clara, CA (US)

(72) Inventors: Meiyuan Zhao, San Jose, CA (US); Jesse R. Walker, Portland, OR (US); Victor B. Lortz, Beaverton, OR (US); Jianqing Zhang, Menlo, CA (US)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 15/087,106

(22) Filed: Mar. 31, 2016

(65) Prior Publication Data

US 2017/0289943 A1    Oct. 5, 2017

(51) Int. Cl.
| | |
|---|---|
| *H04L 29/06* | (2006.01) |
| *H04W 60/04* | (2009.01) |
| *H04W 4/08* | (2009.01) |
| *H04W 12/04* | (2009.01) |

(52) U.S. Cl.
CPC .......... *H04W 60/04* (2013.01); *H04L 63/065* (2013.01); *H04W 4/08* (2013.01); *H04W 12/04* (2013.01)

(58) Field of Classification Search
CPC ............. H04W 60/04; H04W 12/0023; H04W 12/003; H04W 76/14; H04W 4/70; H04W 4/08; H04W 12/04; H04W 12/08; H04W 84/18; H04W 84/12; H04L 63/062; H04L 41/0893; H04L 63/065; H04L 63/10
See application file for complete search history.

(56) References Cited

U.S. PATENT DOCUMENTS

| | | | | |
|---|---|---|---|---|
| 9,357,385 | B2* | 5/2016 | Benoit | ................ H04L 12/2809 |
| 2005/0210252 | A1* | 9/2005 | Freeman | ................. G06F 21/31 |
| | | | | 713/171 |
| 2006/0224519 | A1* | 10/2006 | Ahn | ...................... H04L 63/061 |
| | | | | 705/57 |

(Continued)

FOREIGN PATENT DOCUMENTS

| | | |
|---|---|---|
| WO | 2013120225 | 8/2013 |
| WO | WO-2017172152 A1 | 10/2017 |

OTHER PUBLICATIONS

"International Application Serial No. PCT/US2017/019564, International Search Report dated Jun. 1, 2017", 3 pgs.

(Continued)

*Primary Examiner* — Christopher C Harris
(74) *Attorney, Agent, or Firm* — Schwegman Lundberg & Woessner, P.A.

(57) ABSTRACT

Embodiments are directed to enrollment of an endpoint device in a secure domain. An enrollment request is sent to a delegated registrar (DR) device to initiate a trust-establishment procedure with the DR device to establish initial connectivity and an initial symmetric key to be shared between the DR and the endpoint device. The DR device provides to the endpoint device limited-use credentials for group-access key establishment, and group connectivity parameters for accessing a group administrator (GA) device. The endpoint device and the GA device perform a group-enrollment procedure in which the endpoint device provides the limited-use credentials to the GA device and receives, from the GA device, the group-access key.

21 Claims, 11 Drawing Sheets

(56) References Cited

U.S. PATENT DOCUMENTS

| | | | |
|---|---|---|---|
| 2006/0239208 A1* | 10/2006 | Roberts | H04W 48/14 370/254 |
| 2012/0047551 A1 | 2/2012 | Pattar et al. | |
| 2012/0265913 A1* | 10/2012 | Suumaki | H04W 4/08 710/303 |
| 2013/0036231 A1* | 2/2013 | Suumaki | H04W 12/04 709/228 |
| 2013/0189955 A1 | 7/2013 | Horn et al. | |
| 2013/0318343 A1* | 11/2013 | Bjarnason | H04L 41/0809 713/157 |
| 2014/0241354 A1 | 8/2014 | Shuman et al. | |
| 2015/0237071 A1* | 8/2015 | Maher | H04L 63/20 726/1 |
| 2015/0256544 A1 | 9/2015 | Wu et al. | |
| 2016/0088478 A1 | 3/2016 | Kim et al. | |
| 2016/0373917 A1* | 12/2016 | Logue | H04W 8/005 |
| 2017/0006030 A1* | 1/2017 | Krishnamoorthy | H04L 63/0884 |

OTHER PUBLICATIONS

"International Application Serial No. PCT/US2017/019564, Written Opinion dated Jun. 1, 2017", 6 pgs.
"European Application Serial No. 17776162.4, Extended European Search Report dated Aug. 2, 2019", 7 pgs.
Jeffrey, Lok Tin Woo, "Composing Kerberos and Multimedia Internet KEYing (MIKEY) for Authenticated Transport of Group Keys", IEEE Transactions On Parallel And Distributed Systems, vol. 25, No. 4, (Apr. 2014), XP011541656,, (Apr. 2014), 898-907.
Steiner, J G, "Kerberos: An Authentication Service For Open Network Systems", Proceedings Of The Winter Usenix Conference, XX, XX, (Feb. 9, 1988), XP000671489, (Feb. 9, 1988), 191-202.

* cited by examiner

REGISTRATION OF DEVICES IN SECURE DOMAIN

TECHNICAL FIELD

Embodiments described herein generally relate to information processing and security, more particularly, to management of secure domains, such as networks and computing systems.

BACKGROUND

The Internet of Things (IoT) is the networking of physical objects, such as devices, vehicles, buildings and other items, which are embedded with electronics, software, sensors, and network connectivity that enables these objects to collect and exchange data. IoT as a new communications and interaction paradigm is rapidly developing to offer many new and useful features in applications such as smart home, smart city, industrial control, and smart transportation. Just as traditional computer networks require security solutions to facilitate reliable and private end-to-end communications, IoT deployments will oftentimes require robust security.

Secure grouping IoT endpoint devices, such as sensors, actuators, and the like, into secure domains generally requires administrative management of member devices, membership keys, and credentials. Performing these types of administrative functions has been a challenge in the context of IoT endpoint devices. For instance, IoT endpoint devices have a diverse range of computing and communications capabilities. A group-enrollment protocol should be able to support both, more capable devices, and resource-constrained devices, for robust security.

In addition, it is desirable for the administrative management of IoT device domains to be simple and user-friendly, particularly for layperson users/administrators. IoT endpoint devices tend to have very limited (or sometimes non-existent) user interfaces, further complicating the setup process. Even in the case of sophisticated users, such as businesses employing information technology (IT) professionals, the scale of deployment of devices, which may number in the hundreds, thousands, tens of thousands, etc., presents practical challenges if per-unit setup procedures are called for.

The group-management and registration of new devices should be a process with minimal, and simple, human involvement. Traditional domain management generally involves the use of a centralized registration entity for enrollment of new devices. A number of challenges arise with this type of arrangement, including the possibility that the registration point and administrators may not be able to support the diverse range of communications, networking, and user-interface limitations of endpoint devices, or the sheer number of devices in large deployments. Practical solutions are needed to these, and other, challenges.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1A:
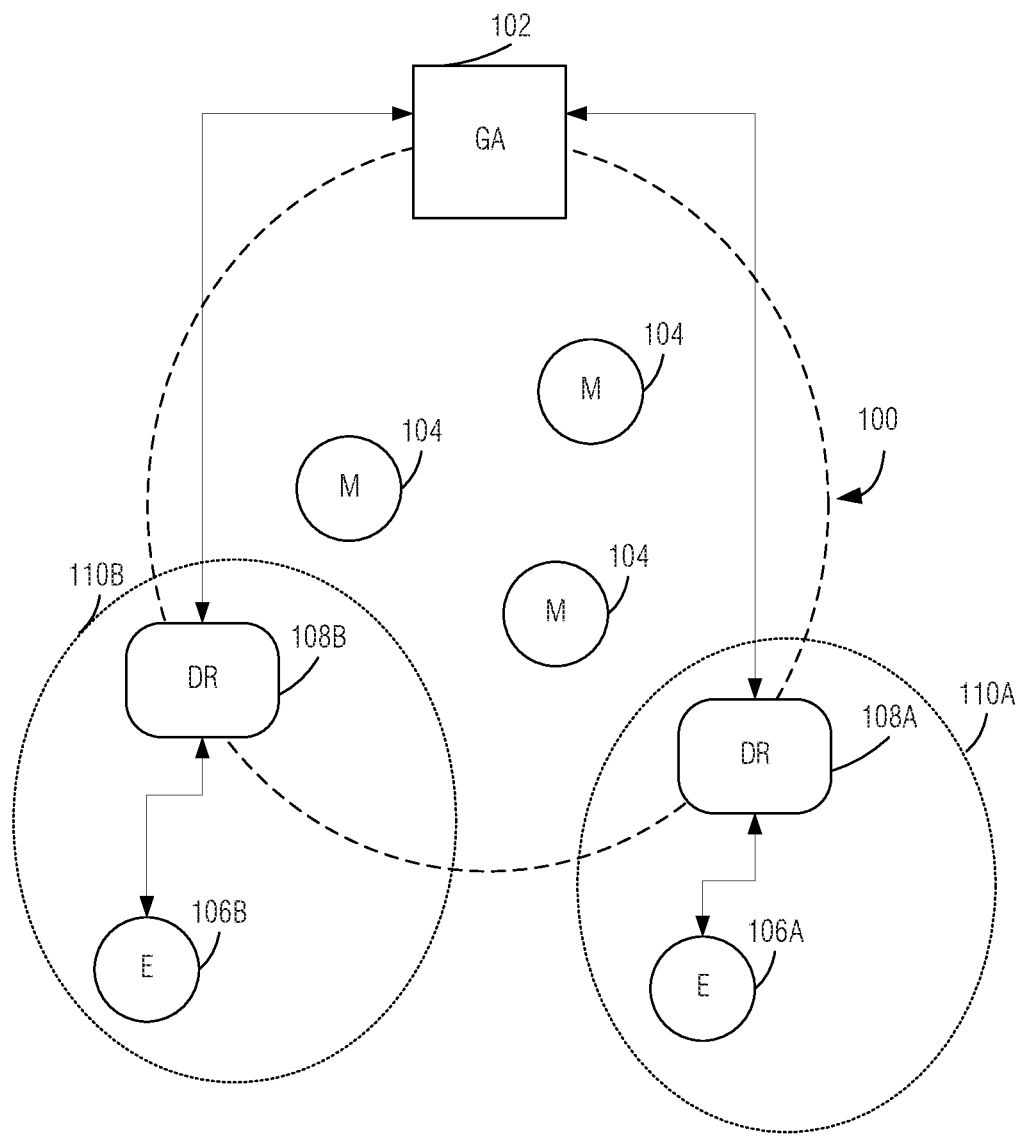
FIG. 1A is a high-level system diagram illustrating various entities that may form a secure domain according to some embodiments.

Aspects of the embodiments are directed to registration, or enrollment, of an endpoint device in a secure domain. An endpoint device in the present context may take any of a variety of device types. For instance, it may be a multi-functional device such as a smartphone, tablet, laptop, desktop PC, smartwatch, wearable form factor (e.g., smart glasses, or a device embedded in garment), etc. An endpoint device may be a substantially simpler device, such as a remote transducer, for example, which has comparatively very limited computing and communications capability. An endpoint device may also be a peripheral device that is meant to operate with a more highly-functional system. Examples of peripheral devices include a computer keyboard, a mouse, a video/audio capture device, a printer, a monitor, etc.

In a related embodiment, an endpoint device includes a logical construct implemented on a physical machine. For example, an endpoint device may be a guest machine that is virtualized on a computer system.

An endpoint device may incorporate one or more transducer devices, e.g., sensors or actuators, or may be interfaced with a stand-alone transducer device, such as a video camera, sound recorder, security camera, security access device such as a doorbell, motion or perimeter breach detector, door lock, or other access control system. An endpoint device may be interfaced with one or more actuators, such as a sound emitter, a display device, lights, a motor, a signal generator, and the like.

Moreover, an endpoint device may constitute an external, wearable, or implantable medical or fitness-monitoring device. Examples include heart rate monitors, infusion pumps, electrocardiogram instruments, blood pressure instruments, ultrasound instruments, automated external defibrillators (AEDs), data loggers, motion monitors, pacemakers, implantable cardioverter-defibrillators (ICDs), etc. An endpoint device may also include a parameter-measuring instrument, such as an industrial pressure sensor, flowmeter, proximity sensor, chemical detector, strain gauge, etc. Furthermore, it should be understood that an endpoint device may be embedded in a greater system, such as an appliance, a vehicle, a media device, a piece of machinery, or the like.

An endpoint device may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

A secure domain in the present context is an organized grouping of devices, including endpoint devices and, optionally, other devices, in which group membership and connectivity is managed or controlled by an administrative entity. In general, device authentication and cryptography are used to assure proper granting of access privileges, and protection of data communications within the secure domain.

FIG. 1 is a high-level system diagram illustrating various entities that may form a secure domain according to some embodiments. As depicted secure domain 100 is defined by group administrator (GA) device 102. GA device 102 defines the group connectivity parameters, and controls access to group of devices within the secure domain. Connectivity parameters according to the present context include such parameters as the mode of communications, the security requirements (e.g., encryption type), the packet routing and addressing protocol, direct-memory access (DMA) addressing, service set identifier (SSID) of a WLAN, and the like. As illustrative examples, GA device 102 may be a networking device, such as a WLAN router or bridge, a group master device, a peripheral device interface module executing on computing hardware under control of an operating system process, a control system head end device, or the like.

Member devices 104 are endpoints and intermediary devices that have been granted access to the secure domain. Member devices 104 may generally communicate amongst themselves. The set of members within a secure domain may be referred to collectively as a group. As illustrated, enrollee devices 106A, 106B (generally referred to individually or collectively as enrollee devices 106), are endpoint devices that are not yet admitted as members of the group, but are following an enrollment protocol that is facilitated by GA 102, and delegated registrar (DR) devices 108A, 108B (generally referred to individually or collectively as DR devices 108).

In one type of embodiment, each of DR devices 108 establishes initial connectivity, illustrated respectively as connectivity 110A and 110B, with enrollee devices 106A, 106B, which is used to initially communicate with, optionally qualify, and configure enrollee devices 106 to locate, communicate with, and seek admission to the group from, GA 102.

In a related embodiment, initial connectivity 110A may be of a different type from initial connectivity 110B. For example, initial connectivity 110A may be of a Bluetooth type, while initial connectivity 110B may be of a Zigbee type. In another related embodiment, the type of connectivity dictated by GA 102 for the group may differ from one, or both, of connectivity types 110A, 110B. For instance, the group connectivity may be based on a WLAN operating under the IEEE 802.11 family of standards. These types of embodiments advantageously provide a solution for connecting enrollee devices 106 to a type of network connectivity that is not readily configurable in the absence of a user interface on the enrollee device. For example, the lack of a data-entry device makes entering a SSID for a WLAN difficult, if not impossible. However, Bluetooth and other self-configuring networks may provide a pairing process that is able to establish a secure initial connectivity through which the connectivity parameters for the group may be automatically provided to the enrollee devices 106, subject to security, capability, and other qualification.

Thereafter, each enrollee device 106 may be enabled to connect to GA device 102 directly to finalize the group enrollment process to become a member of the group. In another type of embodiment, some member devices 104 communicate through an intermediary device to reach GA 102. This may be the case where, for example, an enrollee device is unable to connect to the type of network established by GA device 102. The intermediary device, which may be DR device 108 or another member device 104, continues to provide a compatible network for enrollee device 106 even after it joins the group as a member device 104.

Figure 1B:
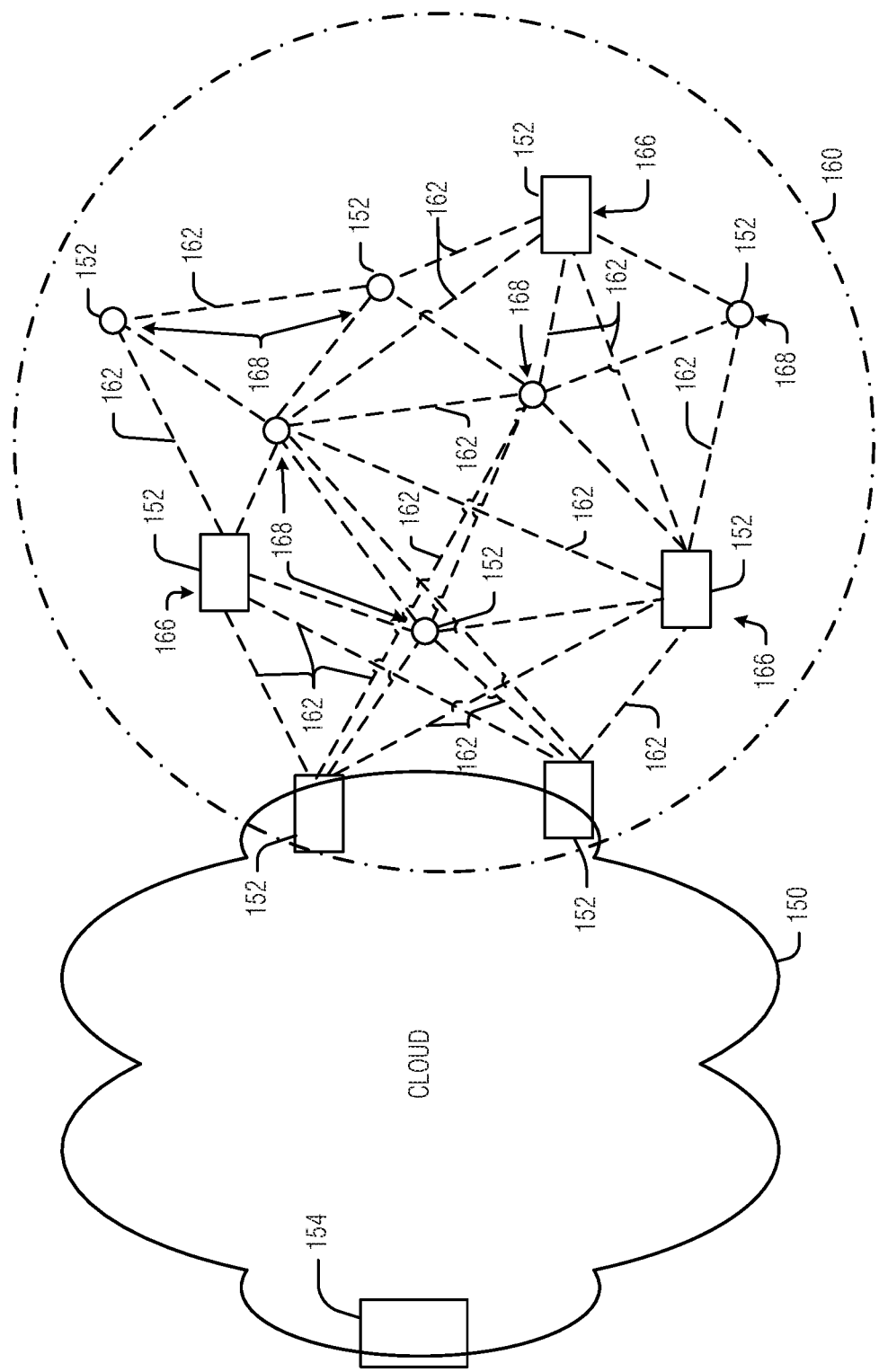
FIG. 1B is a block diagram illustrating a cloud and an Internet of things (IoT) mesh network topology, according to an embodiment, in which a secure domain may be defined.

FIG. 1B is a block diagram illustrating a cloud and an IoT mesh network topology, according to an embodiment, in which a secure domain may be defined. As illustrated, a cloud computing network, or cloud 150, in communication with a mesh network of IoT devices 152, that may be termed a fog 160, may be operating at the edge of the cloud 150. To simplify the diagram, not every IoT device 152 is labeled.

The fog 160 may be considered to be a massively interconnected network wherein a number of IoT devices 152 are in communications with each other, for example, by radio links 162. This may be performed using the open interconnect consortium (OIC) standard specification 6.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 152 are shown in this example, gateways 164, data aggregators 166, and sensors 168, although any combinations of IoT devices 152 and functionality may be used. The gateways 164 may be edge devices that provide communications between the cloud 150 and the fog 160, and may also provide the backend process function for data obtained from sensors 168, such as motion data, flow data, temperature data, and the like. In an example, gateways 164 may perform the role of GA devices 102 in some examples. The data aggregators 166 may collect data from any number of the sensors 168, and perform the back end processing function for the analysis. Data aggregators 166 may perform the role of DR devices 108 in some examples. The results, raw data, or both may be passed along to the cloud 150 through the gateways 164. The sensors 168 may be full IoT devices 152, for example, capable of both collecting data and processing the data. In some cases, the sensors 168 may be more limited in functionality, for example, collecting the data and allowing the data aggregators 166 or gateways 164 to process the data. Sensors 168 may be considered to be endpoint devices 104 or enrollee devices 106 in some examples.

Communications from any IoT device 152 may be passed along the most convenient path between any of the IoT devices 152 to reach the gateways 164. In these networks, the number of interconnections provide substantial redundancy, allowing communications to be maintained, even with the loss of a number of IoT devices 152. Further, the use of a mesh network may allow IoT devices 152 that are very low power or located at a distance from infrastructure to be used, as the range to connect to another IoT device 152 may be much less than the range to connect to the gateways 164.

The fog 160 of these IoT devices 152 devices may be presented to devices in the cloud 150, such as a server 154, as a single device located at the edge of the cloud 150, e.g., a fog 160 device. In this example, the alerts coming from the fog 160 device may be sent without being identified as coming from a specific IoT device 152 within the fog 160.

In some examples, the IoT devices 152 may be configured using an imperative programming style, e.g., with each IoT device 152 having a specific function and communication partners. However, the IoT devices 152 forming the fog 160 device may be configured in a declarative programming style, allowing the IoT devices 152 to reconfigure their operations and communications, such as to determine needed resources in response to conditions, queries, and device failures. The data from these sensors 168 may then be aggregated and analyzed by any combination of the sensors 168, data aggregators 166, or gateways 164, before being sent on by the fog 160 device to the server 154 to answer the query. In this example, IoT devices 152 in the fog 160 may select the sensors 168 used based on the query, such as adding data from flow sensors or temperature sensors. Further, if some of the IoT devices 152 are not operational, other IoT devices 152 in the fog 160 device may provide analogous data, if available.

Figure 2A:
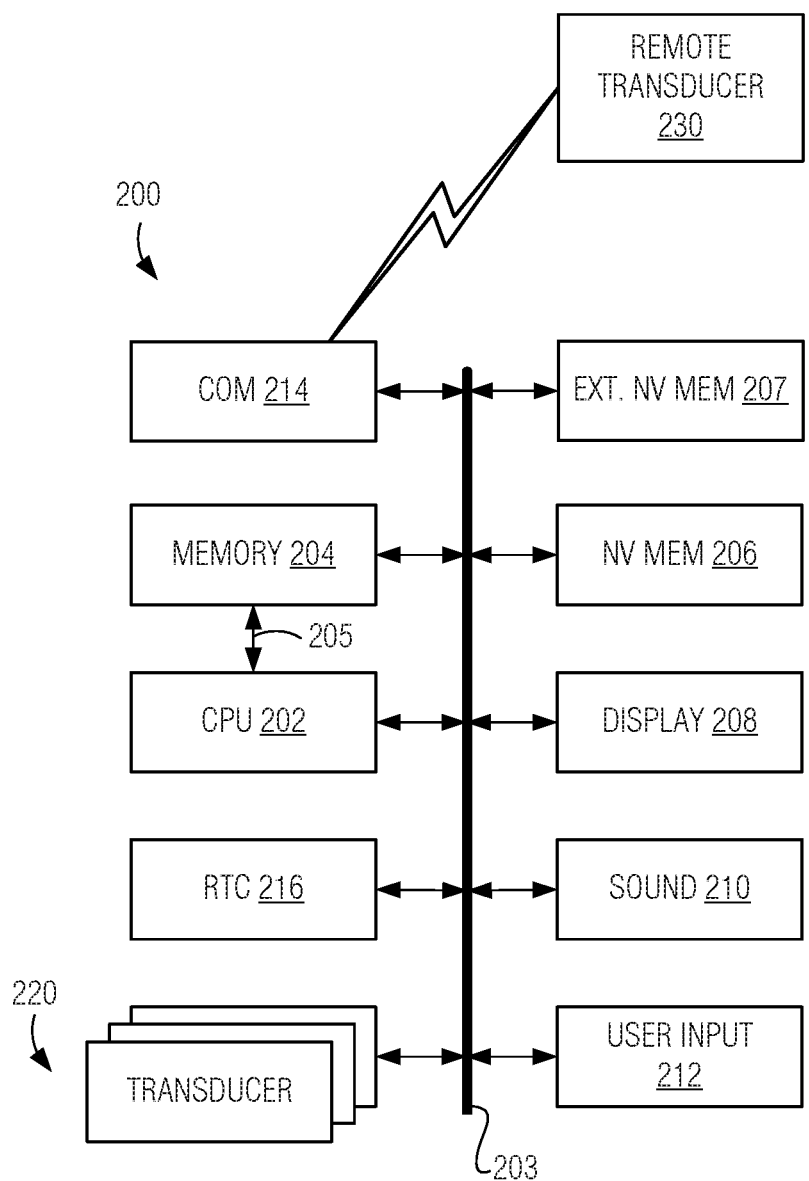
FIG. 2A is a block diagram illustrating an exemplary system architecture of a processor-based computing device according to an embodiment.

FIG. 2A is a block diagram illustrating an exemplary system architecture of a computing device 200 according to an embodiment. Computing device 200 may be representative of an endpoint device 104, 106, a delegated registrar device 108, a group-administrator device 102, or other type of device that may operate as a member or infrastructure device of a secure domain. It is important to note that computing device 200 is a richly-featured embodiment that may be realized as described; in addition, some components of computing device 200 may be implemented while others are optional, or excluded, in various embodiments. The following Additional Notes and Examples section details various configurations, without limitation, that are contemplated.

Central processor unit (CPU) 202 includes one or more microprocessors on which the overall functionality of computing device 100 is executed. CPU 202 is formed from hardware that is electrically interfaced with system link 203, which carries data and control signaling between the various components. CPU 202 may contain one or more processing cores, each of which has one or more arithmetic logic units (ALU), instruction fetch unit, instruction decode unit, control unit, registers, data stack pointer, program counter, and other essential components according to the particular architecture of the processor. As an illustrative example, CPU 202 may be a x86-type of processor, a microcontroller, a digital signal processor (DSP), or the like.

As illustrated, system link 203 is similarly interfaced with each of the other components of system architecture 200. Memory 204 includes working memory space, and is constructed from suitable high-speed memory devices such as synchronous dynamic random access memory (SDRAM). In the embodiment illustrated, CPU 202 may access memory 204 using high-speed interface 205. Non-volatile memory 206 is constructed using read-only memory (ROM), electrically-erasable programmable read-only memory (EE-PROM), flash memory or other suitable non-volatile storage technology. Non-volatile memory 206 stores system and application software that is executed by CPU 202 and, in some cases, by processors present in one or more other components.

External non-volatile memory 207 includes an interface such as a secure digital (SD) card slot, which may accept removable storage media to be used as additional non-volatile data storage.

Display 208 includes display 104 and circuitry for interfacing the display 104 with the system, as well as video driving circuity. Sound 210 contains circuitry for driving the audio output to a speaker or headphones, and the circuitry for interfacing with the system. User input 212 contains the circuitry for interfacing with input devices such as input device 106. Communications block 214 represents communications circuitry and circuitry for interfacing the communications circuitry with the system. Communications block 214 may include a radio for communicating over a cellular network such as a network designed according to the Long-Term Evolution (LTE), LTE-Advanced, 5G or Global System for Mobile Communications (GSM) families of standards. Also, communications circuitry 214 may include a Wi-Fi communications radio according to the IEEE 801.11 family of standards, or a Bluetooth radio circuit according to the IEEE 802.15 family of standards. Real-time clock 216 includes circuitry that provides a clock that maintains the current date and time, and that interfaces the clock to the system.

Transducer devices 220 are integrated with computing device 200. According to various embodiments, transducer devices 220 include a plurality of different types of sensing or actuating transducers and their associated processing and interface circuitry, such as a camera, GPS, accelerometer, biometric sensor, light-emitting device, sound-emitting device, motion-producing device, heat-producing device, etc.

The processing circuitry associated with each corresponding sensing transducer may include amplification, buffering, filtering, or other signal-conditioning circuitry to receive the raw analog signal from the corresponding transducer and prepare the analog signaling for digitization, analog-to-digital conversion circuitry to perform sampling, quantization, and digital encoding, and, in some cases, further processing to produce a digital signal representing the physical phenomenon being measured by the sensor in a form that is readable by CPU 202. Actuating transducers may likewise include digital-to-analog (D/A) converter circuitry, signal filtering and amplification circuitry, etc., that is coupled to an actuator.

Remote transducer device 230 is interfaced with CPU 202 via communication block 214, as depicted. Remote transducer device 230 may be any type of transducer device described above, or may be a different type of transducer device altogether.

According to one type of embodiment, the captured data provided by transducer devices 220, remote transducer device 230, or some combination thereof, is used to produce a random value, which in turn may be used for any suitable application of hash generation, cryptographic security, distinctive identification generation, or other application that benefits from the randomness.

Figure 2B:
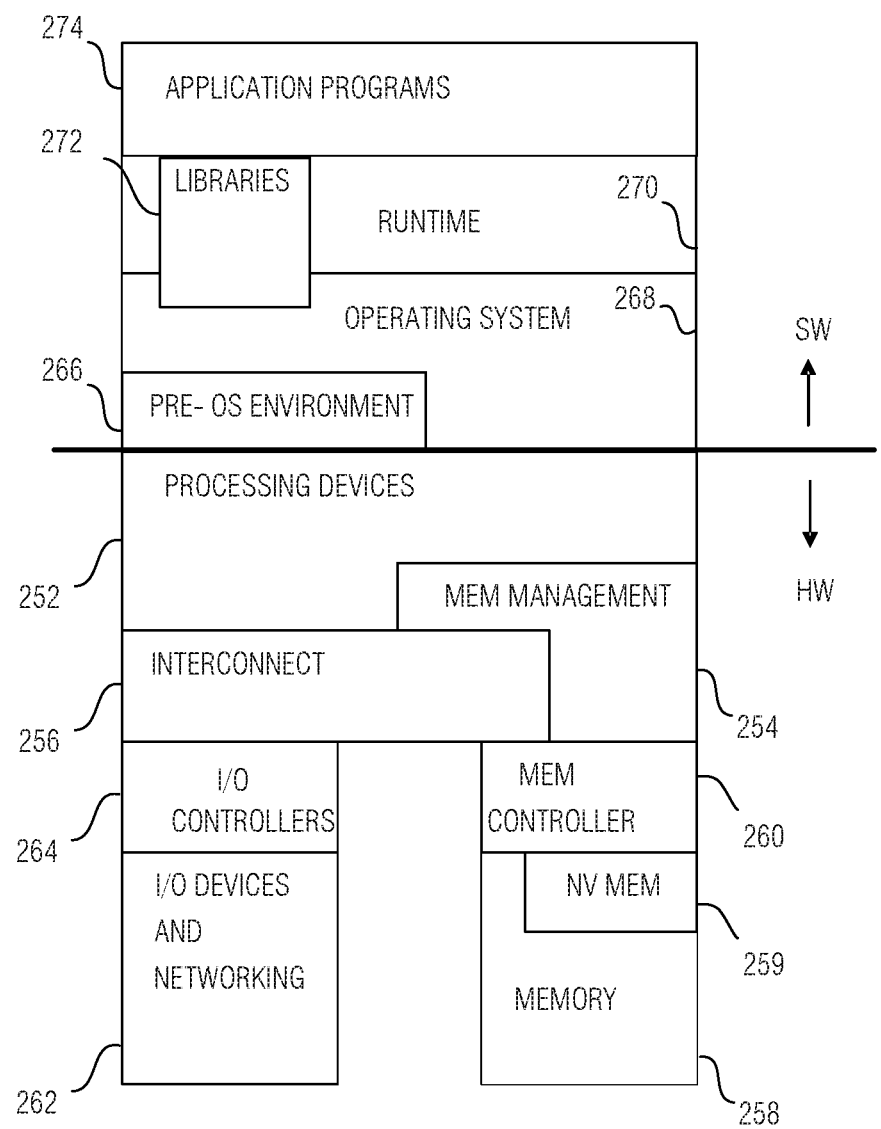
FIG. 2B is a diagram illustrating an exemplary hardware and software architecture of a computing device such as the one depicted in FIG. 2A, in which various interfaces between hardware components and software components are shown.

FIG. 2B is a diagram illustrating an example hardware and software architecture of a computing device such as the one depicted in FIG. 2A, in which various interfaces between hardware components and software components are shown. The example architecture illustrated in FIG. 2B and detailed below represents a relatively full-featured embodiment. It will be understood that a number of the features of this example may be optional, or entirely omitted, according to various embodiments. For instance, in a simple embedded-system implementation, the operating system, libraries, runtime, and other software components, as described below, may be absent. Similarly, certain hardware components, such as the memory management device, system interconnect, I/O controllers, and the memory controller may have simplified circuitry integrated with a microcontroller, or may be omitted according to various embodiments.

As indicated by HW, hardware components are represented below the divider line, whereas software components denoted by SW reside above the divider line. On the hardware side, processing devices 252 (which may include one or more microprocessors, digital signal processors, etc., each having one or more processor cores, are interfaced with memory management device 254 and system interconnect 256. Memory management device 254 provides mappings between virtual memory used by processes being executed, and the physical memory. Memory management device 254 may be an integral part of a central processing unit which also includes the processing devices 252.

Interconnect 256 includes a backplane such as memory, data, and control lines, as well as the interface with input/output devices, e.g., PCI, USB, etc. Memory 258 (e.g., dynamic random access memory-DRAM) and non-volatile memory 259 such as flash memory (e.g., electrically-erasable read-only memory—EEPROM, NAND Flash, NOR Flash, etc.) are interfaced with memory management device 254 and interconnect 256 via memory controller 260. This architecture may support direct memory access (DMA) by peripherals in one type of embodiment. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 262, which interface with interconnect 256 via corresponding I/O controllers 264.

On the software side, a pre-operating system (pre-OS) environment 266, which is executed at initial system start-up and is responsible for initiating the boot-up of the operating system. One traditional example of pre-OS environment 266 is a system basic input/output system (BIOS). In present-day systems, a unified extensible firmware interface (UEFI) is implemented. Pre-OS environment 266, is responsible for initiating the launching of the operating system, but also provides an execution environment for embedded applications according to certain aspects of the invention.

Operating system (OS) 268 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 268 provides device drivers, and a variety of common services such as those that facilitate interfacing with peripherals and networking, that provide abstraction for application programs so that the applications do not need to be responsible for handling the details of such common operations. Operating system 268 additionally provides a graphical user interface (GUI) module that facilitates interaction with the user via peripheral devices such as a monitor, keyboard, mouse, microphone, video camera, touchscreen, and the like.

Runtime system 270 implements portions of an execution model, including such operations as putting parameters onto the stack before a function call, the behavior of disk input/output (I/O), and parallel execution-related behaviors. Runtime system 270 may also perform support services such as type checking, debugging, or code generation and optimization.

Libraries 272 include collections of program functions that provide further abstraction for application programs. These include shared libraries, dynamic linked libraries (DLLs), for example Libraries 272 may be integral to the operating system 268, runtime system 270, or may be added-on features, or even remotely-hosted. Libraries 272 define an application program interface (API) through which a variety of function calls may be made by application programs 274 to invoke the services provided by the operating system 268. Application programs 274 are those programs that perform useful tasks for users, beyond the tasks performed by lower-level system programs that coordinate the basis operability of the computing device itself.

Figure 3:
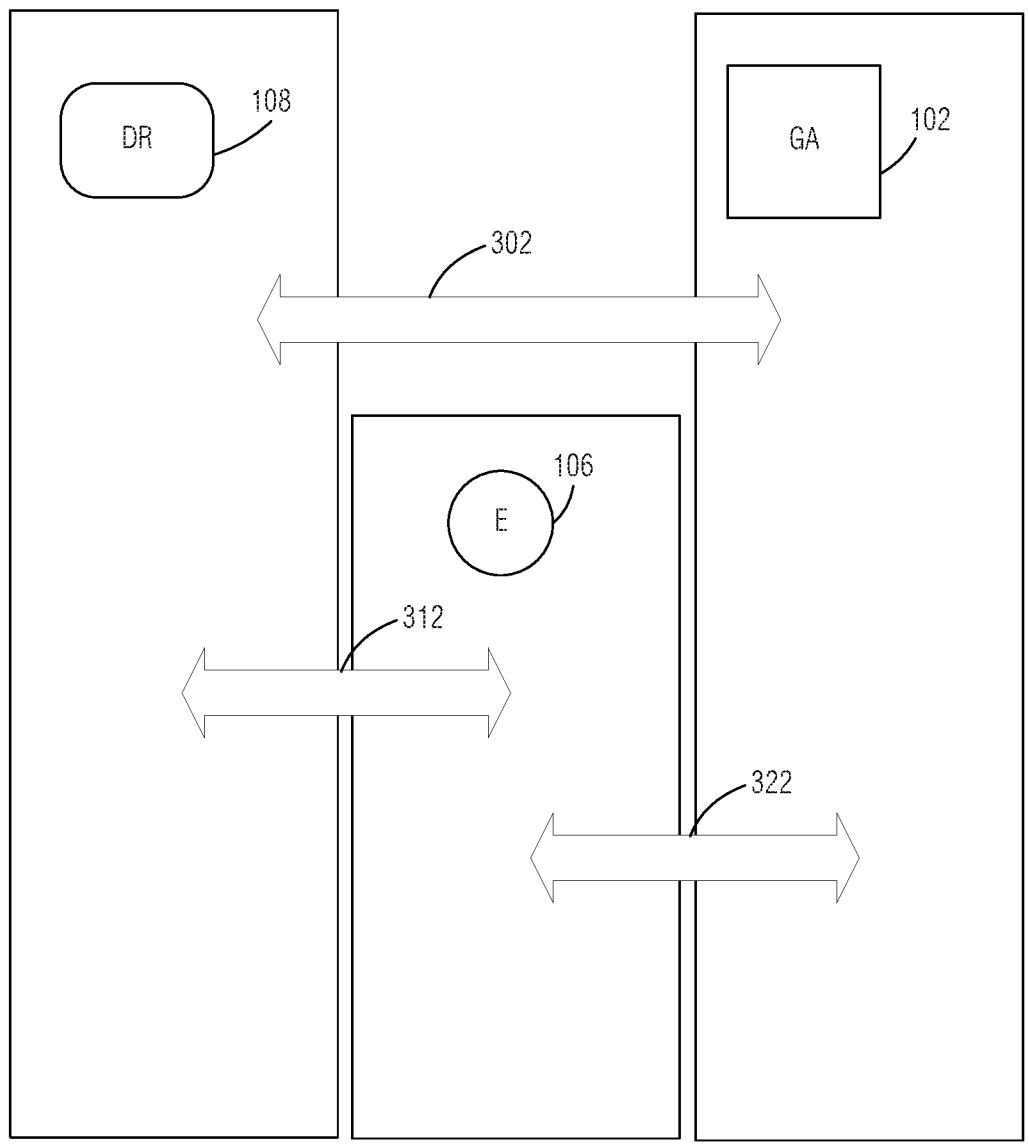
FIG. 3 is a process flow diagram illustrating an overview of a device-enrollment process according to some embodiments

FIG. 3 is a process flow diagram illustrating an overview of a device-enrollment process carried out by GA 102, enrollee device 106, and DR device 108 according to some embodiments. At the outset, DR 108 is established as a delegatee device at 302. Here, DR device is authenticated, registered with the group, and granted authority to operate as an initial registrar of enrollee devices. As a result, DR device 108 stores an authorizing credential for interacting with GA device 102. For example, the authorizing credential may be a secret symmetric key that is shared between DR device 108 and GA device 102.

Later, enrollee device 106 seeking to join the network conducts an initial exchange 312 with DR device 108 to establish an initial trust relationship and to obtain limited-use credentials to be used for a group-enrollment procedure. The initial trust relationship may be established by a pairing procedure according to one type of embodiment. In a related embodiment, the trust-establishment procedure includes an automated negotiation to select a device pairing protocol from among multiple protocols that may be supported by DR device 108. The trust-establishment procedure may establish a shared secret, and an initial symmetric key based on that shared secret, for example.

In a related embodiment, the limited-use credentials are intended to be for short-term use only (e.g., for up to 2 minutes, 10 minutes, 30 minutes, 1 hour, or some other limited time period sufficient to allow the enrollee device 106 to attempt to establish communications with the GA device 102).

In one type of embodiment, the limited-use credentials include a pair of tokens, with the first token being based on session data of the initial connectivity, and on the initial symmetric key, and the second token being based on the session data, and on an authorizing credential (e.g., symmetric key) that represents a trust relationship between the DR device 108 and GA device 102. One or both tokens may be based on a current timestamp, which may be used to expire the limited-use credentials. The time stamp may indicate the time of the creation of the limited-use credentials, or it may indicate a future expiration time. In a related embodiment, the first token and the second token each includes a common secret value, that binds the two tokens to one another within the current session that binds GA device, DR device, and Enrollee device.

In initial exchange 312, enrollee device 106 also receives group connectivity parameters for accessing GA device 102. These may include, for example, a network route to GA device 102, a service set identifier (SSID) of a wireless local area network (WLAN) through which a connection to GA device 102 is facilitated, a routing table indicating a route to GA device 102, an Internet Protocol (IP) or other network address of GA device 102, a DMA address of GA device 102, and similar types of parameters and their value(s).

Subsequently to initial exchange 312, a second exchange 322 is performed by enrollee device 106 and GA device 102, in which a group-enrollment procedure is carried out. In the group-enrollment procedure, enrollee device 106 provides the limited-use credentials to GA device 102 and receives a group-access key that enables enrollee device 106 to join the secure domain as a member device 104, based on validation of the limited-use credentials.

Figure 4:
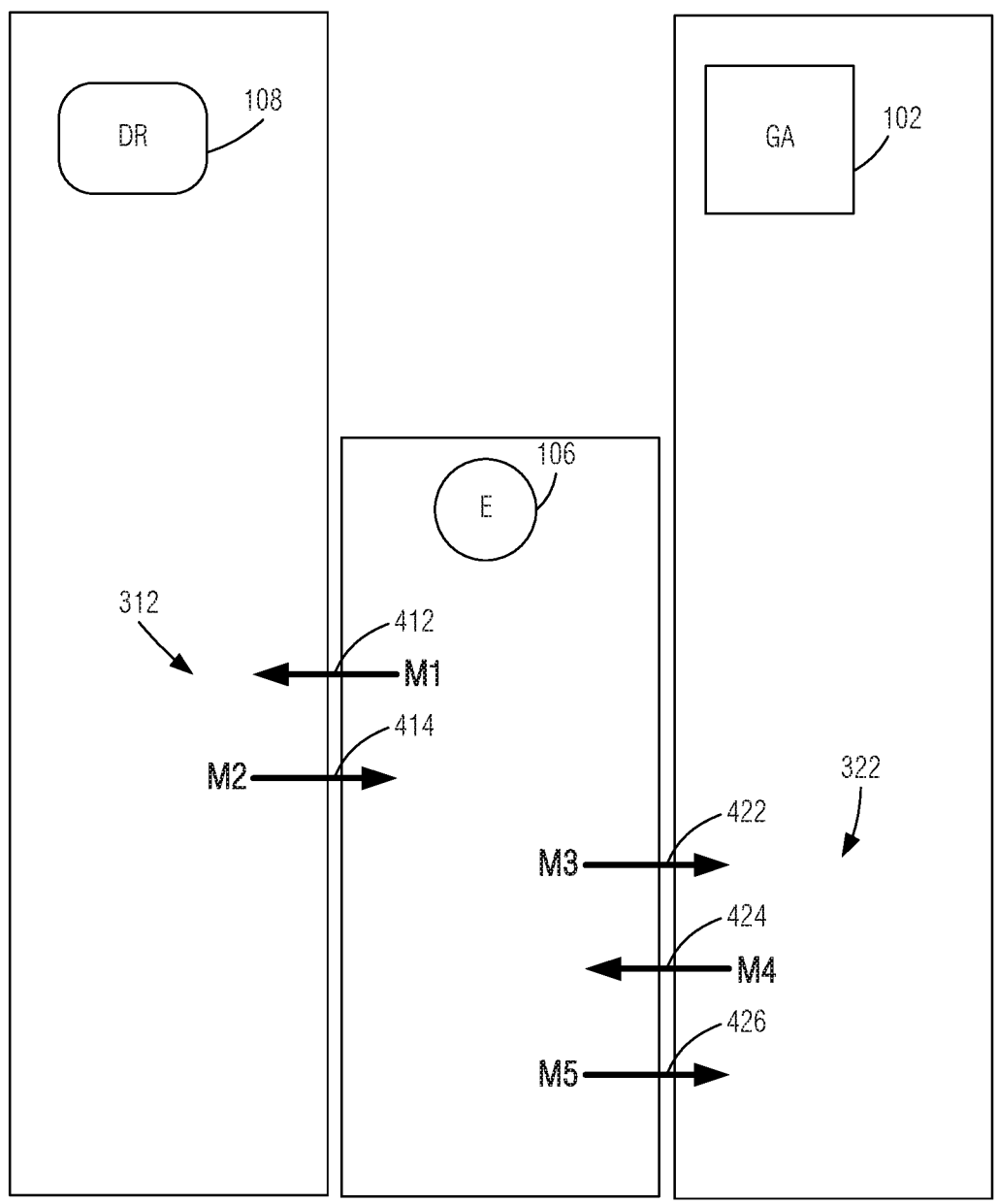
FIG. 4 is a process flow diagram illustrating a more detailed embodiment of a device-enrollment process according to a related aspect.

FIG. 4 is a process flow diagram illustrating a more detailed embodiment of a device-enrollment process carried out by GA 102, enrollee device 106, and DR device 108. In this example, initial exchange 312 includes a first message, M1 at 412, which is broadcast or unicast by enrollee device 106 for reception by a DR device, such as DR device 108, to request initiation of the enrollment process. In response, DR device 108 qualifies enrollee device 106, and provides the limited-use credentials and group connectivity parameters in message M2 at 414.

In a related embodiment, before DR device 108 responds to enrollee device 106 with limited-use credentials in message M2 at 414, DR device 108 verifies that enrollee device 106 is eligible to join the group and is authenticated to do so. The success of validation is reflected by an authorizing secret key between DR device 108 and enrollee device 106.

If DR device 108 and enrollee device 106 have established a trust relationship prior to execution of the enrollment protocol, the authorizing key can be used to create and protect message M2.

In a related embodiment, if DR device 108 and enrollee device 106 have no prior trust relationship, the devices may carry out a protocol to establish a trust relationship on demand In an example, the negotiation and execution of a secure pairing protocol may be performed to establish trust between DR device 108 and enrollee device 106. As a result, an authorizing secret key is established to protect the limited-use credential for enrollee device 106.

Second exchange 322 in this example includes a series of three messages, M3, M4, and M5, indicated respectively at reference numerals 422, 424, and 426. Enrollee device 106 submits the limited-use credentials to GA device 102 using message M3 at 422. GA device 102 validates the limited-use credentials by verifying that they are indeed generated from DR device 108 for the current protocol instance, and creates key material for enrollment of enrollee device 106, protected by the limited-use credentials, and transmits it to enrollee device using message M4 at 424. GA may also securely transmit a group-access key in message M4. In response, enrollee device 106 validates message M4, recovers membership key materials, confirms GA's final authorization to join the group, recovers the group-access key, and verifies successful receipt of membership credential match by composing message M5 at 426, protected with key(s) derived from the newly-established membership credential.

GA device 108 validates success receipt of message M5 and confirms success of membership enrollment for enrollee device 106.

FIGS. 5A-5C, FIG. 6, and FIGS. 7A-7B are process flow diagrams illustrating actions taken by enrollee device 106, DR device 108, and GA device 102, respectively, in carrying out a device-enrollment protocol according to certain embodiments. Each process block includes detailed descriptions of constituent operations using security protocol notation, where E represents enrollee device 106, DR represents DR device 108, and GA represents GA device 102. As illustrated, operations 502 and 504 of FIG. 5A produce message M1. Operations 602-606 of FIG. 6 produce message M2. Operations 510-512 of FIG. 5B produce message M3. Operations 702-706 of FIG. 7A produce message M4. Operations 520 and 522 of FIG. 5C produce message M5. Operations 710 of FIG. 7B verify the success of the enrollment of enrollee device 106.

Figure 5A:
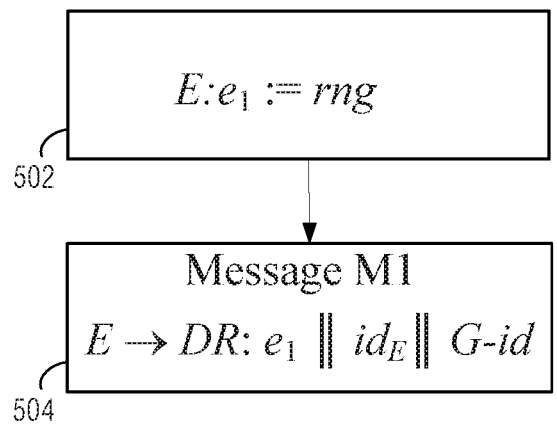
FIGS. 5A-5C, FIG. 6, and FIGS. 7A-7B are process flow diagrams illustrating actions taken by an enrollee device, a delegated registrar device, and a group authority device, respectively, in carrying out a device-enrollment protocol according to certain embodiments.

In FIG. 5A, E sends message M1 as a request for enrollment to a secure group, identified as G-id. Message M1 is sent to DR and includes a randomly-generated value $e_1$, along with an identifier of E, and an identifier G-id of the group that E wishes to join.

Figure 6:
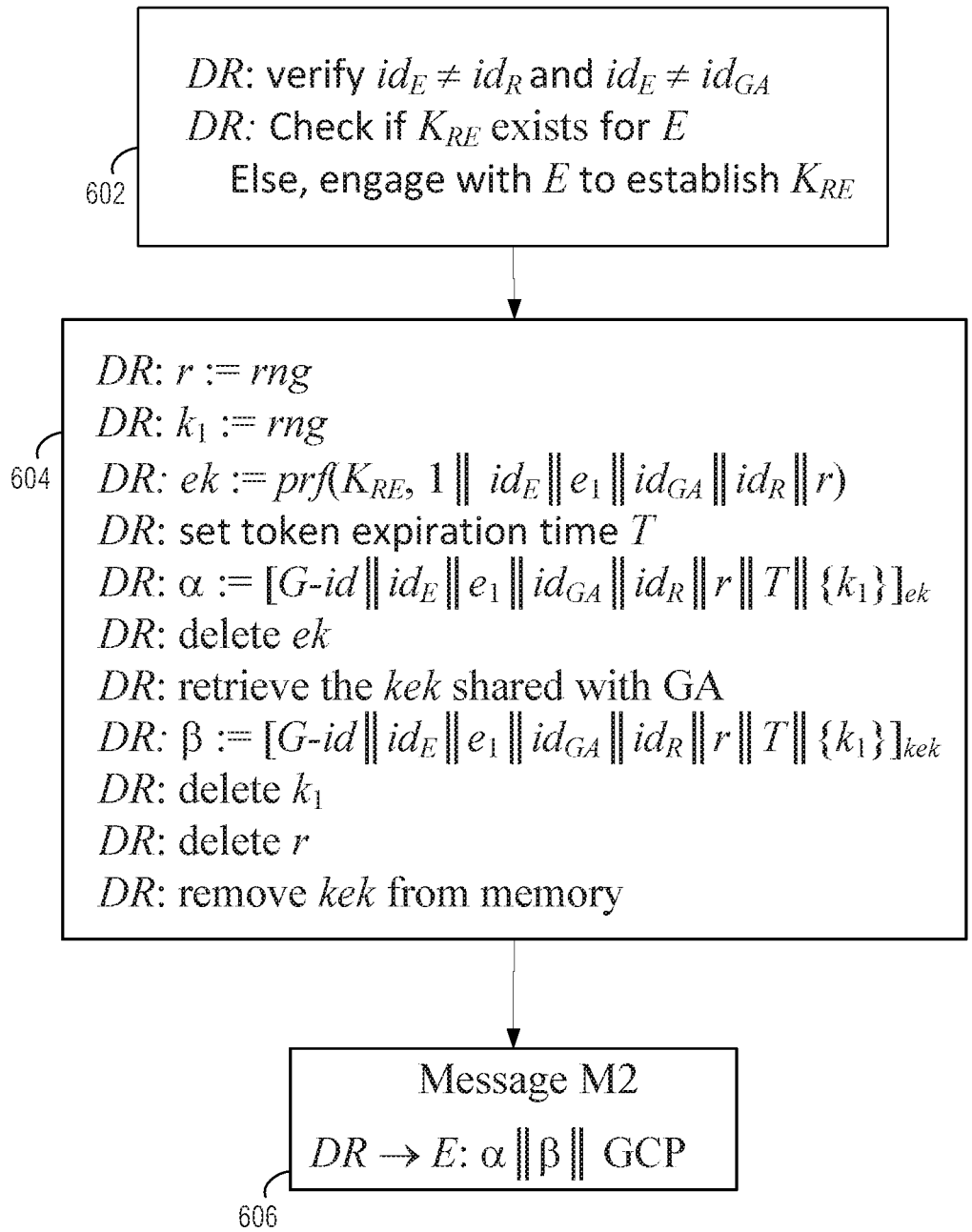

Referring to FIG. 6, at operations 602, DR parses message M1, and retrieve its contents to determine if DR and E have a prior-established trust relationship already. If E is already trusted, DR retrieves the symmetric key $K_{RE}$ that it shares with E. Otherwise, DR and E engage in an initial connectivity (e.g., pairing) protocol to establish trust on demand and an initial symmetric key $K_{RE}$ (e.g., a pairwise shared key) to be associated with the trust.

The choice and negotiation of pairing method depends on the capabilities and limitations of DR and E, as well as on group registration requirements and policy, as promulgated by GA. DR may verify that E satisfies the requirements to be admitted as a member in the trusted group (e.g., authentication of firmware, OS integrity, security capabilities, device manufacturer/model/version, etc.).

At 604, with the establishment of $K_{RE}$, DR generates a randomly generated nonce r, and a fresh random key material (e.g., seed value) $k_1$ to be used for E's limited-use credentials. DR creates a token α for E that encrypts $k_1$ with protocol session data and current timestamp as authenticated tag, using ek, the key derived from $K_{RE}$ and protocol instance data, including identities and random number $e_1$. DR creates a token β for GA that encrypts $k_1$ with protocol session data and current timestamp as authenticated tag, using kek, the key shared by DR and GA. Tokens α and β each includes value $e_1$ and r, as well as all involved identities that associate these tokens with E.

At 606, DR sends the two tokens, α, and β, to E in message M2, along with group connectivity parameter (GCP) information for E to use to locate, and connect with, GA.

Figure 5B:
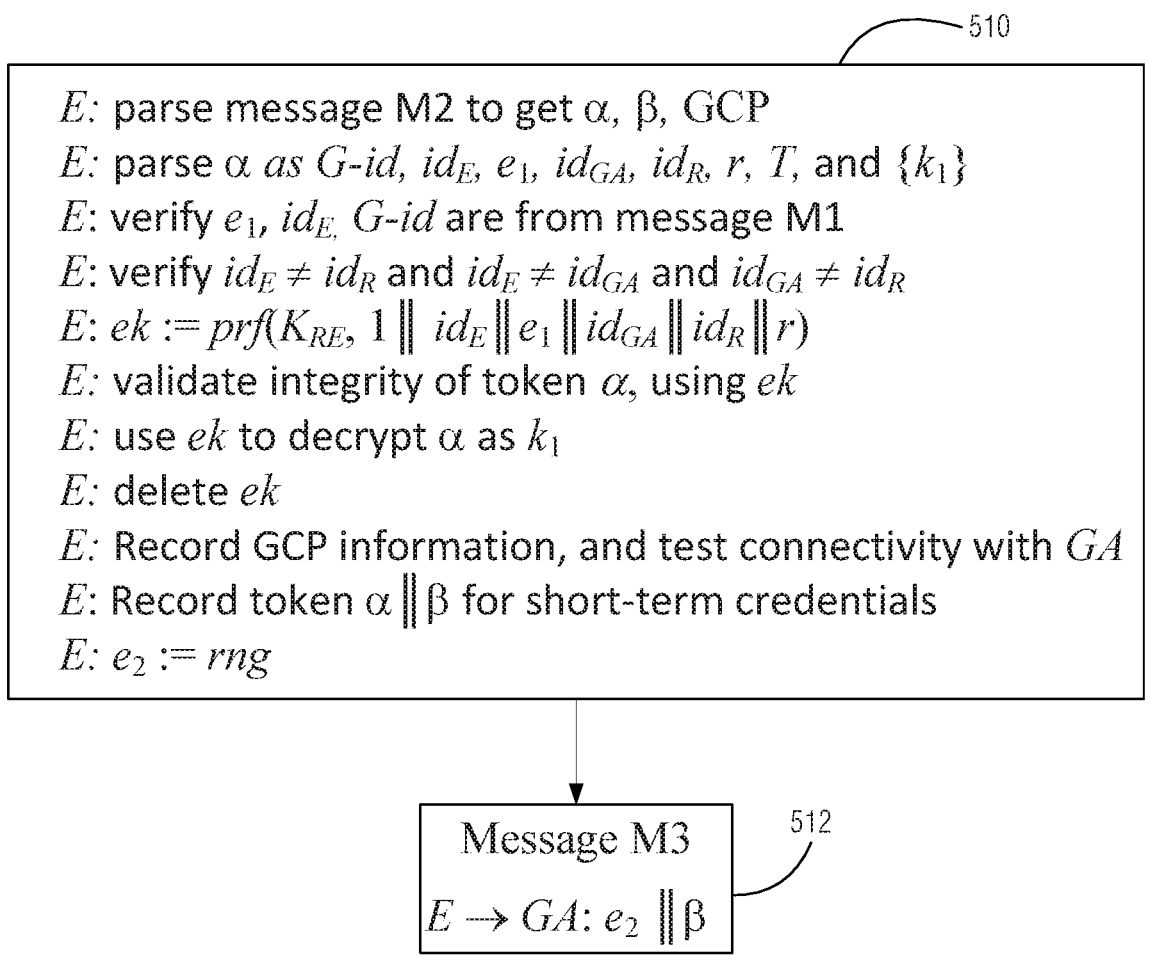

As illustrated in FIG. 5B, in operations 510 E receives and parses message M2, and validates that the token α is authenticated with current session data. E recovers key material $k_1$ from the message, and performs various other security-related operations as detailed, including generation of random value $e_2$.

At 512, E connects to GA and forwards token β to GA, in message M3, to start an exchange with GA. Message M3 also includes $e_2$.

Figure 7A:
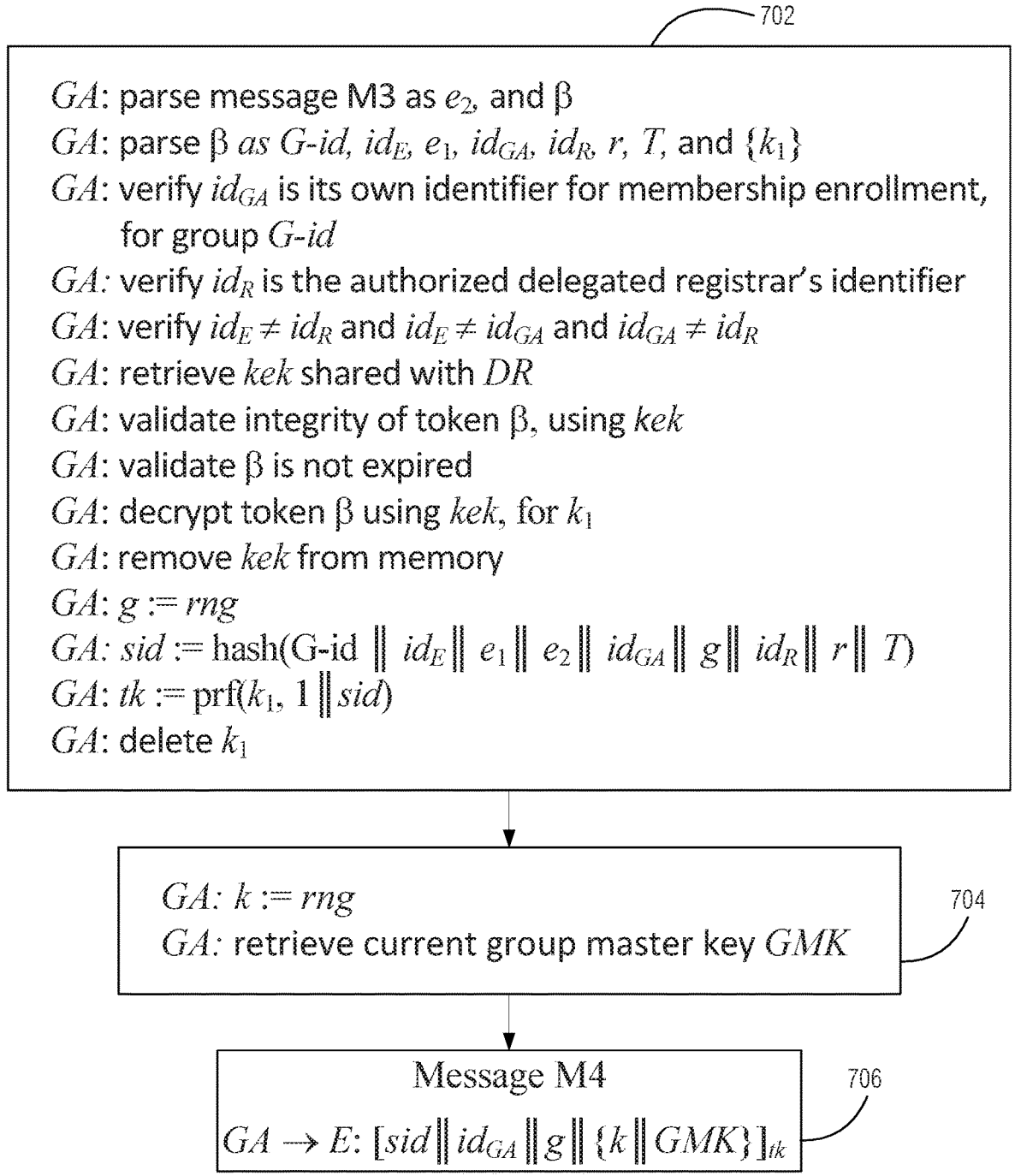

In FIG. 7A, at 702, GA parses and validates the token β to ensure it is authenticated with current session data and is reasonably fresh according to the timestamp in the token and predefined freshness criteria. GA confirms that DR has authorized the enrollment for E by validating the authentication tag of β using kek, and recovering the same key material $k_1$.

At 704, GA issues to E persistent membership by generating a fresh key material (e.g., seed value) k. At 706 GA sends message M4 to E, encrypted by a key tk derived from the limited-use membership credential $k_1$ as part of operations 702. The encryption may also be authenticated with session data, with the addition of g, a randomly-generated value by GA to contribute to freshness validation in the session. In message M4, GA provides the group master key GMK to E together with k. Protection of message M4 by key material tk (derived from $k_1$) allows GA to confirm E's continued knowledge of $k_1$. The presence of random value g associates message M4 with GA.

Figure 5C:
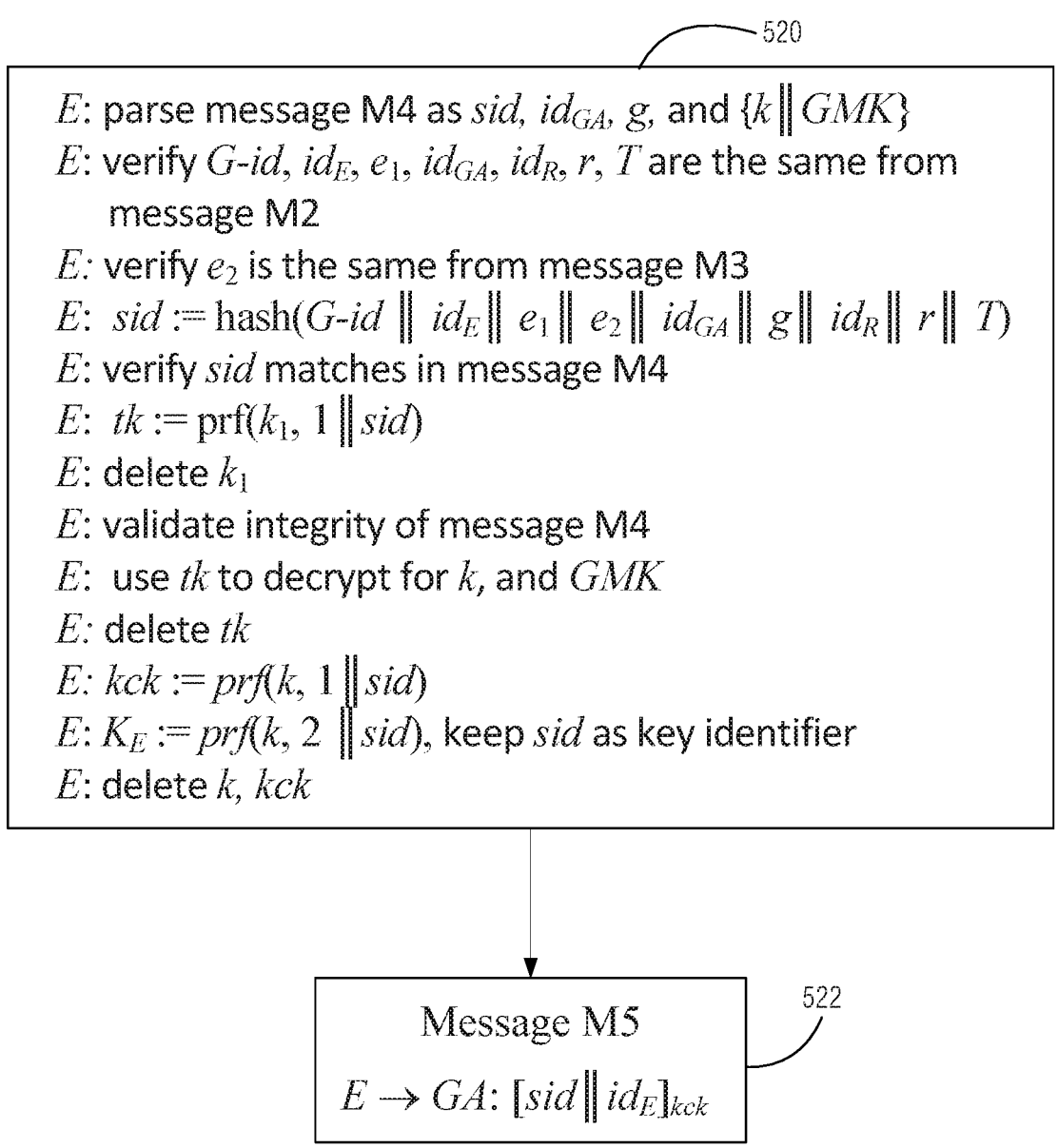

In FIG. 5C, at 520, E, with the knowledge of $k_1$, decrypts message M4 to recover new key material k and GMK. E then confirms receipt of k to GA, by composing message M5 at 522 with protection using a newly-derived key, kck, derived from k. Value sid, also included in message M5, is based on G-id, $id_E$, $e_1$, $e_2$, $id_{GA}$, g, $id_R$, r, and T, thus representing its verifiable association with the previous operations of the protocol.

Figure 7B:
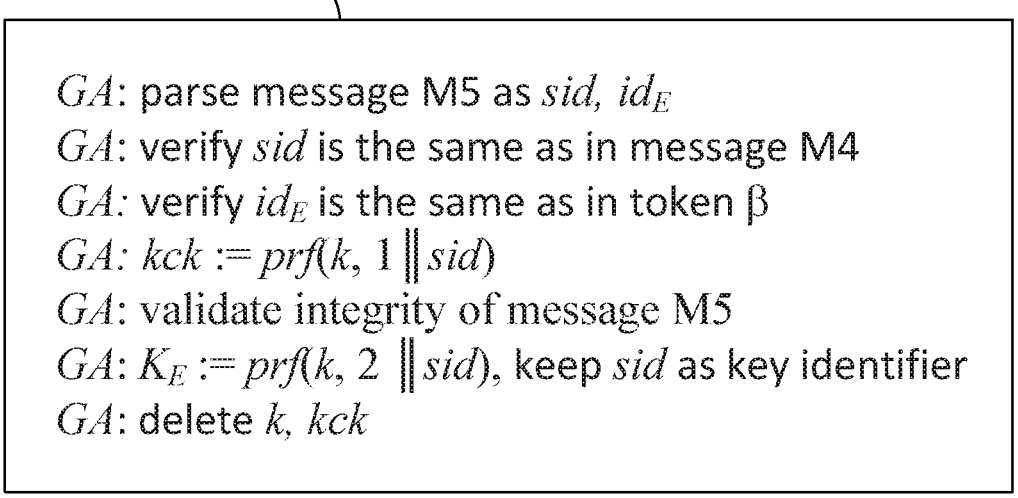

Finally, in operations 710 shown in FIG. 7B, GA parses and validates message M5 to confirm the successful establishment of E's membership credential and agreement with E. E's membership key is derived from the new key material k, bound with current authenticated session data. The process flow diagrams of FIGS. 5A-5C, 6, and 7A-7B illustrate an example process that is a richly-featured embodiment that may be realized as described; in addition, portions of the process may be implemented while others are optional, or excluded, in various embodiments. The following Additional Notes and Examples section details various combinations, without limitation, that are contemplated. It should also be noted that in various embodiments, certain process operations may be performed in a different ordering than depicted in FIGS. 5A-5C, 6, and 7A-7B, provided that the logical flow and integrity of the process is not disrupted in substance.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor core configured using software; the general-purpose hardware processor core may be configured as respective different modules at different times. Software may accordingly configure a hardware processor core, for example, to constitute a particular module at one instance of time and to constitute a different module at a different instance of time.

ADDITIONAL NOTES & EXAMPLES

Example 1 is a delegated registrar (DR) apparatus for enrolling an endpoint device in a secure domain, the DR device comprising hardware including an interface to data communications circuitry, a processor, and a data store containing instructions that, when executed, cause the hardware to: store an authorizing credential for interacting with a group administrator (GA) device that controls membership in the secure domain and group connectivity parameters; in response to an enrollment request originated by an enrollee device, execute a trust-establishment procedure with the enrollee device to establish initial connectivity and an initial symmetric key to be shared with the enrollee device; and provide limited-use credentials for group-access key establishment, and the group connectivity parameters, to the enrollee device for interacting with the GA device to perform a group-enrollment procedure.

In Example 2, the subject matter of Example 1 optionally includes wherein the group connectivity parameters include an address of the GA device.

In Example 3, the subject matter of Example 2 optionally includes wherein the address of the GA device is an internet protocol (IP) address.

In Example 4, the subject matter of any one or more of Examples 2-3 optionally include wherein the address of the GA device is a direct memory access (DMA) address.

In Example 5, the subject matter of any one or more of Examples 1-4 optionally include wherein the group connectivity parameters include a network route to the GA device.

In Example 6, the subject matter of any one or more of Examples 1-5 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 7, the subject matter of any one or more of Examples 1-6 optionally include wherein the group membership credential for interacting with the GA device is a symmetric key.

In Example 8, the subject matter of any one or more of Examples 1-7 optionally include wherein the trust-establishment procedure includes a device pairing operation.

In Example 9, the subject matter of any one or more of Examples 1-8 optionally include wherein the trust-establishment procedure includes an automated negotiation to select a device pairing protocol.

In Example 10, the subject matter of any one or more of Examples 1-9 optionally include wherein the authorizing credential includes a symmetric key shared between the DR apparatus and the GA device.

In Example 11, the subject matter of any one or more of Examples 1-10 optionally include wherein the limited-use credentials include a first token and a second token; wherein the first token is based on session data of the initial connectivity, and on the initial symmetric key; and wherein the second token is based on the session data, and on the authorizing credential.

In Example 12, the subject matter of Example 11 optionally includes wherein at least one of the first token and the second token is based on a current timestamp and is subject to expiration.

In Example 13, the subject matter of any one or more of Examples 11-12 optionally include wherein the first token and the second token each includes a common freshly and randomly generated secret value.

In Example 14, the subject matter of any one or more of Examples 1-13 optionally include wherein the GA device is a wireless network access point.

In Example 15, the subject matter of any one or more of Examples 1-14 optionally include wherein the GA device is a peripheral device interface module executing on computing hardware under control of an operating system process.

Example 16 is an endpoint apparatus for enrollment in a secure domain, the endpoint apparatus comprising hardware including an interface to data communications circuitry, a processor, and a data store containing instructions that, when executed, cause the hardware to: send an enrollment request to a delegated registrar (DR) device to initiate a trust-establishment procedure with the DR device to establish initial connectivity and an initial symmetric key to be shared between the DR and the endpoint apparatus; receive, from the DR device, limited-use credentials for group-access key establishment, and group connectivity parameters for interacting with a group administrator (GA) device, wherein the GA device controls membership in the secure domain and the group connectivity parameters; and perform a group-enrollment procedure via a communications connection with the GA device, wherein the endpoint apparatus provides the limited-use credentials to the GA device and receives, from the GA device, the group-access key.

In Example 17, the subject matter of Example 16 optionally includes wherein the group connectivity parameters include an address of the GA device.

In Example 18, the subject matter of Example 17 optionally includes wherein the address of the GA device is an internet protocol (IP) address.

In Example 19, the subject matter of any one or more of Examples 17-18 optionally include wherein the address of the GA device is a direct memory access (DMA) address.

In Example 20, the subject matter of any one or more of Examples 16-19 optionally include wherein the group connectivity parameters include a network route to the GA device.

In Example 21, the subject matter of any one or more of Examples 16-20 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 22, the subject matter of any one or more of Examples 16-21 optionally include wherein the trust-establishment procedure includes a device pairing operation.

In Example 23, the subject matter of any one or more of Examples 16-22 optionally include wherein the trust-establishment procedure includes an automated negotiation to select a device pairing protocol.

In Example 24, the subject matter of any one or more of Examples 16-23 optionally include wherein the limited-use credentials include a first token and a second token; wherein the first token is based on session data of the initial connectivity, and on the initial symmetric key; and wherein the second token is based on the session data, and on an authorizing credential that the DR uses for interacting with a the GA device.

In Example 25, the subject matter of Example 24 optionally includes wherein at least one of the first token and the second token is based on a current timestamp.

In Example 26, the subject matter of any one or more of Examples 24-25 optionally include wherein the first token and the second token each includes a common freshly and randomly generated secret value.

In Example 27, the subject matter of any one or more of Examples 16-26 optionally include wherein the GA device is a wireless network access point.

In Example 28, the subject matter of any one or more of Examples 16-27 optionally include wherein the GA device is a peripheral device interface module executing on computing hardware under control of an operating system process.

In Example 29, the subject matter of any one or more of Examples 16-28 optionally include wherein the endpoint apparatus is an Internet-of-things (IoT) device.

In Example 30, the subject matter of any one or more of Examples 16-29 optionally include wherein the endpoint apparatus is a computer peripheral device.

Example 31 is a group administrator (GA) apparatus for controlling membership for enrollee devices in a secure domain, the GA apparatus comprising hardware including an interface to data communications circuitry, a processor, and a data store containing instructions that, when executed, cause the hardware to: establish a trust relationship with a delegated registrar (DR) device that executes a trust-establishment procedure with an enrollee device to provide limited-use credentials for group-access key establishment to the enrollee, the limited-use credentials being representative of the trust relationship; and execute a group-enrollment procedure interactively with the enrollee device, wherein the GA apparatus verifies the limited-use credentials based on the trust relationship with the DR and, in response to successful verification of the limited-use credentials, issue a persistent group membership credential to the enrollee device.

In Example 32, the subject matter of Example 31 optionally includes wherein the GA apparatus is accessible by the enrollee device having the limited-use credentials via an internet protocol (IP) address of the GA apparatus.

In Example 33, the subject matter of any one or more of Examples 31-32 optionally include wherein the GA apparatus is accessible by the enrollee device having the limited-use credentials via a direct memory access (DMA) address of the GA apparatus.

In Example 34, the subject matter of any one or more of Examples 31-33 optionally include wherein the GA apparatus is configured to establish group connectivity parameters for the secure domain, including a service set identifier (SSID) of at least one type of network through which a connection to the GA apparatus is facilitated.

In Example 35, the subject matter of any one or more of Examples 31-34 optionally include wherein the persistent group membership credential is a symmetric key.

In Example 36, the subject matter of any one or more of Examples 31-35 optionally include wherein the trust relationship between the DR device and the GA apparatus is demonstrable via an authorizing credential that includes a symmetric key shared between the DR device and the GA apparatus.

In Example 37, the subject matter of any one or more of Examples 31-36 optionally include wherein the limited-use credentials include a first token and a second token; wherein the first token is based on session data of initial connectivity between the enrollee device and the DR device; and wherein the second token is based on the session data, and on an indicator or the trust relationship between the DR device and the GA apparatus.

In Example 38, the subject matter of Example 37 optionally includes wherein at least one of the first token and the second token is based on a current timestamp and is subject to expiration.

In Example 39, the subject matter of any one or more of Examples 37-38 optionally include wherein the first token and the second token each includes a common freshly and randomly generated secret value.

In Example 40, the subject matter of any one or more of Examples 31-39 optionally include wherein the GA apparatus is a wireless network access point.

In Example 41, the subject matter of any one or more of Examples 31-40 optionally include wherein the GA apparatus is a peripheral device interface module executing on computing hardware under control of an operating system process.

Example 42 is a machine-implemented method for enrolling an endpoint device in a secure domain, the method comprising: storing, by a delegated registrar (DR) device, an authorizing credential for interacting with a group administrator (GA) device that controls membership in the secure domain and group connectivity parameters; in response to an enrollment request originated by an enrollee device, executing, by the DR device, a trust-establishment procedure with the enrollee device to establish initial connectivity and an initial symmetric key to be shared with the enrollee device; and providing, by the DR device, limited-use credentials for group-access key establishment, and the group connectivity parameters, to the enrollee device for interacting with the GA device to perform a group-enrollment procedure.

In Example 43, the subject matter of Example 42 optionally includes wherein the group connectivity parameters include an address of the GA device.

In Example 44, the subject matter of Example 43 optionally includes wherein the address of the GA device is an internet protocol (IP) address.

In Example 45, the subject matter of any one or more of Examples 43-44 optionally include wherein the address of the GA device is a direct memory access (DMA) address.

In Example 46, the subject matter of any one or more of Examples 42-45 optionally include wherein the group connectivity parameters include a network route to the GA device.

In Example 47, the subject matter of any one or more of Examples 42-46 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 48, the subject matter of any one or more of Examples 42-47 optionally include wherein the group membership credential for interacting with the GA device is a symmetric key.

In Example 49, the subject matter of any one or more of Examples 42-48 optionally include wherein the trust-establishment procedure includes a device pairing operation.

In Example 50, the subject matter of any one or more of Examples 42-49 optionally include wherein the trust-establishment procedure includes an automated negotiation to select a device pairing protocol.

In Example 51, the subject matter of any one or more of Examples 42-50 optionally include wherein the authorizing credential includes a symmetric key shared between the DR apparatus and the GA device.

In Example 52, the subject matter of any one or more of Examples 42-51 optionally include wherein the limited-use credentials include a first token and a second token; wherein the first token is based on session data of the initial connectivity, and on the initial symmetric key; and wherein the second token is based on the session data, and on the authorizing credential.

In Example 53, the subject matter of Example 52 optionally includes wherein at least one of the first token and the second token is based on a current timestamp and is subject to expiration.

In Example 54, the subject matter of any one or more of Examples 52-53 optionally include wherein the first token and the second token each includes a common freshly and randomly generated secret value.

Example 55 is a machine-implemented method for enrolling an endpoint device in a secure domain, the method being carried out by an endpoint device, and comprising: sending an enrollment request to a delegated registrar (DR) device to initiate a trust-establishment procedure with the DR device to establish initial connectivity and an initial symmetric key to be shared between the DR and the endpoint device; receiving, from the DR device, limited-use credentials for group-access key establishment, and group connectivity parameters for interacting with a group administrator (GA) device, wherein the GA device controls membership in the secure domain and the group connectivity parameters; and performing a group-enrollment procedure via a communications connection with the GA device, including providing the limited-use credentials to the GA device and receiving, from the GA device, the group-access key.

In Example 56, the subject matter of Example 55 optionally includes wherein the group connectivity parameters include an address of the GA device.

In Example 57, the subject matter of Example 56 optionally includes wherein the address of the GA device is an internet protocol (IP) address.

In Example 58, the subject matter of any one or more of Examples 56-57 optionally include wherein the address of the GA device is a direct memory access (DMA) address.

In Example 59, the subject matter of any one or more of Examples 55-58 optionally include wherein the group connectivity parameters include a network route to the GA device.

In Example 60, the subject matter of any one or more of Examples 55-59 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 61, the subject matter of any one or more of Examples 55-60 optionally include wherein the trust-establishment procedure includes performing a device pairing operation.

In Example 62, the subject matter of any one or more of Examples 55-61 optionally include wherein the trust-establishment procedure includes performing an automated negotiation to select a device pairing protocol.

In Example 63, the subject matter of any one or more of Examples 55-62 optionally include wherein the limited-use credentials include a first token and a second token; wherein the first token is based on session data of the initial connectivity, and on the initial symmetric key; and wherein the second token is based on the session data, and on an authorizing credential that the DR uses for interacting with a the GA device.

In Example 64, the subject matter of Example 63 optionally includes wherein at least one of the first token and the second token is based on a current timestamp.

In Example 65, the subject matter of any one or more of Examples 63-64 optionally include wherein the first token and the second token each includes a common freshly and randomly generated secret value.

Example 66 is a machine-implemented method for controlling membership for enrollee devices in a secure domain, the method being carried out by a group administrator (GA) device, and comprising: establishing a trust relationship with a delegated registrar (DR) device that executes a trust-establishment procedure with an enrollee device to provide limited-use credentials for group-access key establishment to the enrollee, the limited-use credentials being representative of the trust relationship; and executing a group-enrollment procedure interactively with the enrollee device, including verifying the limited-use credentials based on the trust relationship with the DR and, in response to successful verification of the limited-use credentials, issuing a persistent group membership credential to the enrollee device.

In Example 67, the subject matter of Example 66 optionally includes establishing group connectivity parameters for the secure domain, including establishing a service set identifier (SSID) of at least one type of network through which a connection to the GA device is facilitated.

In Example 68, the subject matter of any one or more of Examples 66-67 optionally include wherein the persistent group membership credential is a symmetric key.

In Example 69, the subject matter of any one or more of Examples 66-68 optionally include wherein establishing the trust relationship between the DR device and the GA device includes sharing a symmetric key with the DR device.

In Example 70, the subject matter of any one or more of Examples 66-69 optionally include wherein the limited-use credentials include a first token and a second token; wherein the first token is based on session data of initial connectivity between the enrollee device and the DR device; and wherein the second token is based on the session data, and on an indicator or the trust relationship between the DR device and the GA device.

Example 71 is a delegated registrar (DR) system for enrolling an endpoint device in a secure domain, the system comprising: means for storing, an authorizing credential for interacting with a group administrator (GA) device that controls membership in the secure domain and group connectivity parameters; means for executing a trust-establishment procedure with the enrollee device to establish initial connectivity and an initial symmetric key to be shared with the enrollee device, in response to an enrollment request originated by an enrollee device; and means for providing limited-use credentials for group-access key establishment, and the group connectivity parameters, to the enrollee device for interacting with the GA device to perform a group-enrollment procedure.

In Example 72, the subject matter of Example 71 optionally includes wherein the group connectivity parameters include an address of the GA device.

In Example 73, the subject matter of Example 72 optionally includes wherein the address of the GA device is an internet protocol (IP) address.

In Example 74, the subject matter of any one or more of Examples 72-73 optionally include wherein the address of the GA device is a direct memory access (DMA) address.

In Example 75, the subject matter of any one or more of Examples 71-74 optionally include wherein the group connectivity parameters include a network route to the GA device.

In Example 76, the subject matter of any one or more of Examples 71-75 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 77, the subject matter of any one or more of Examples 71-76 optionally include wherein the group membership credential for interacting with the GA device is a symmetric key.

In Example 78, the subject matter of any one or more of Examples 71-77 optionally include wherein the trust-establishment procedure includes a device pairing operation.

In Example 79, the subject matter of any one or more of Examples 71-78 optionally include wherein the trust-establishment procedure includes an automated negotiation to select a device pairing protocol.

In Example 80, the subject matter of any one or more of Examples 71-79 optionally include wherein the authorizing credential includes a symmetric key shared between the DR apparatus and the GA device.

In Example 81, the subject matter of any one or more of Examples 71-80 optionally include wherein the limited-use credentials include a first token and a second token; wherein the first token is based on session data of the initial connectivity, and on the initial symmetric key; and wherein the second token is based on the session data, and on the authorizing credential.

In Example 82, the subject matter of Example 81 optionally includes wherein at least one of the first token and the second token is based on a current timestamp and is subject to expiration.

In Example 83, the subject matter of any one or more of Examples 81-82 optionally include wherein the first token and the second token each includes a common freshly and randomly generated secret value.

Example 84 is a system for enrolling an endpoint device in a secure domain, the system comprising: means for sending an enrollment request to a delegated registrar (DR) device to initiate a trust-establishment procedure with the DR device to establish initial connectivity and an initial symmetric key to be shared between the DR and the endpoint device; means for receiving, from the DR device, limited-use credentials for group-access key establishment, and group connectivity parameters for interacting with a group administrator (GA) device, wherein the GA device controls membership in the secure domain and the group connectivity parameters; and means for performing a group-enrollment procedure via a communications connection with the GA device, including providing the limited-use credentials to the GA device and receiving, from the GA device, the group-access key.

In Example 85, the subject matter of Example 84 optionally includes wherein the group connectivity parameters include an address of the GA device.

In Example 86, the subject matter of Example 85 optionally includes wherein the address of the GA device is an internet protocol (IP) address.

In Example 87, the subject matter of any one or more of Examples 85-86 optionally include wherein the address of the GA device is a direct memory access (DMA) address.

In Example 88, the subject matter of any one or more of Examples 84-87 optionally include wherein the group connectivity parameters include a network route to the GA device.

In Example 89, the subject matter of any one or more of Examples 84-88 optionally include wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

In Example 90, the subject matter of any one or more of Examples 84-89 optionally include wherein the trust-establishment procedure includes performing a device pairing operation.

In Example 91, the subject matter of any one or more of Examples 84-90 optionally include wherein the trust-establishment procedure includes performing an automated negotiation to select a device pairing protocol.

In Example 92, the subject matter of any one or more of Examples 84-91 optionally include wherein the limited-use credentials include a first token and a second token; wherein the first token is based on session data of the initial connectivity, and on the initial symmetric key; and wherein the second token is based on the session data, and on an authorizing credential that the DR uses for interacting with a the GA device.

In Example 93, the subject matter of Example 92 optionally includes wherein at least one of the first token and the second token is based on a current timestamp.

In Example 94, the subject matter of any one or more of Examples 92-93 optionally include wherein the first token and the second token each includes a common freshly and randomly generated secret value.

Example 95 is a group administrator (GA) system for controlling membership for enrollee devices in a secure domain, the system comprising: means for establishing a trust relationship with a delegated registrar (DR) device that executes a trust-establishment procedure with an enrollee device to provide limited-use credentials for group-access key establishment to the enrollee, the limited-use credentials being representative of the trust relationship; and means for executing a group-enrollment procedure interactively with the enrollee device, including verifying the limited-use credentials based on the trust relationship with the DR and, in response to successful verification of the limited-use credentials, issuing a persistent group membership credential to the enrollee device.

In Example 96, the subject matter of Example 95 optionally includes means for establishing group connectivity parameters for the secure domain, including means for establishing a service set identifier (SSID) of at least one type of network through which a connection to the GA device is facilitated.

In Example 97, the subject matter of any one or more of Examples 95-96 optionally include wherein the persistent group membership credential is a symmetric key.

In Example 98, the subject matter of any one or more of Examples 95-97 optionally include wherein the means for establishing the trust relationship between the DR device and the GA device include means for sharing a symmetric key with the DR device.

In Example 99, the subject matter of any one or more of Examples 95-98 optionally include wherein the limited-use credentials include a first token and a second token; wherein the first token is based on session data of initial connectivity between the enrollee device and the DR device; and wherein the second token is based on the session data, and on an indicator or the trust relationship between the DR device and the GA device.

Example 100 is at least one computer-readable medium containing instructions that, when executed on a computing platform, cause the computing platform to carry out the method according to any one or more of Examples 42-70.

Example 101 is a computing system comprising means for carrying out the method according to any one or more of Examples 42-70.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A delegated registrar (DR) device for enrolling an endpoint device in a secure domain, the DR device comprising hardware including an interface to data communications circuitry, a processor, and a data store containing instructions that, when executed, cause the hardware to:
store an authorizing credential for interacting with a group administrator (GA) device that controls membership in the secure domain and group connectivity parameters;
in response to an enrollment request originated by an enrollee device, execute a trust-establishment procedure with the enrollee device to establish initial connectivity and an initial symmetric key to be shared with the enrollee device, wherein the limited-use credentials include a first token and a second token, wherein the first token is based on session data of the initial connectivity and on the initial symmetric key, and wherein the second token is based on the session data and on the authorizing credential; and
provide limited-use credentials for group-access key establishment, and the group connectivity parameters, to the enrollee device for interacting with the GA device to perform a group-enrollment procedure.

2. The device of claim 1, wherein the group connectivity parameters include an address of the GA device.

3. The device of claim 1, wherein the group connectivity parameters include a network route to the GA device.

4. The device of claim 1, wherein the group connectivity parameters include a service set identifier (SSID) of at least one type of network through which a connection to the GA device is facilitated, the at least one type of network selected from the group consisting of: a wireless local area network (WLAN), a wireless personal area network (WPAN), a wireless mesh network, or any combination thereof.

5. The device of claim 1, wherein the trust-establishment procedure includes an automated negotiation to select a device pairing protocol.

6. The device of claim 1, wherein the authorizing credential includes a symmetric key shared between the DR device and the GA device.

7. The device 1, wherein at least one of the first token and the second token is based on a current timestamp and is subject to expiration.

8. The device 1, wherein the first token and the second token each includes a common freshly and randomly generated secret value.

9. An endpoint apparatus for enrollment in a secure domain, the endpoint apparatus comprising hardware including an interface to data communications circuitry, a processor, and a data store containing instructions that, when executed, cause the hardware to:
send an enrollment request to a delegated registrar (DR) device to initiate a trust-establishment procedure with the DR device to establish initial connectivity and an initial symmetric key to be shared between the DR device and the endpoint apparatus;
receive, from the DR device, limited-use credentials for group-access key establishment, and group connectivity parameters for interacting with a group administrator (GA) device, wherein the GA device controls membership in the secure domain and the group connectivity parameters, wherein the limited-use credentials include a first token and a second token, wherein the first token is based on session data of the initial connectivity and on the initial symmetric key, and wherein the second token is based on the session data and on the authorizing credential; and
perform a group-enrollment procedure via a communications connection with the GA device, wherein the endpoint apparatus provides the limited-use credentials to the GA device and receives, from the GA device, the group-access key.

10. The endpoint apparatus of claim 9, wherein the trust-establishment procedure includes a device pairing operation.

11. The endpoint apparatus of claim 9, wherein the trust-establishment procedure includes an automated negotiation to select a device pairing protocol.

12. The endpoint apparatus of claim 9, wherein at least one of the first token and the second token is based on a current timestamp.

13. The endpoint apparatus of claim 9, wherein the first token and the second token each includes a common freshly and randomly generated secret value.

14. A machine-implemented method for enrolling an endpoint device in a secure domain, the method being carried out by an endpoint device, and comprising:
sending an enrollment request to a delegated registrar (DR) device to initiate a trust-establishment procedure with the DR device to establish initial connectivity and an initial symmetric key to be shared between the DR device and the endpoint device;
receiving, from the DR device, limited-use credentials for group-access key establishment, and group connectivity parameters for interacting with a group administrator (GA) device, wherein the GA device controls membership in the secure domain and the group connectivity parameters, wherein the limited-use credentials include a first token and a second token, wherein the first token is based on session data of the initial connectivity and on the initial symmetric key, and wherein the second token is based on the session data and on the authorizing credential; and
performing a group-enrollment procedure via a communications connection with the GA device, including providing the limited-use credentials to the GA device and receiving, from the GA device, the group-access key.

15. The method of claim 14, wherein the trust-establishment procedure includes performing a device pairing operation.

16. The method of claim 14, wherein the trust-establishment procedure includes performing an automated negotiation to select a device pairing protocol.

17. The method of claim 14, wherein at least one of the first token and the second token is based on a current timestamp.

18. The method of claim 14, wherein the first token and the second token each includes a common freshly and randomly generated secret value.

19. At least one non-transitory computer-readable medium containing instructions that, when executed by a group authority (GA) device, cause the GA device to perform operations comprising:

establishing a trust relationship with a delegated registrar (DR) device that executes a trust-establishment procedure with an enrollee device to provide limited-use credentials for group-access key establishment to the enrollee device, the limited-use credentials being representative of the trust relationship, wherein the limited-use credentials include a first token and a second token, wherein the first token is based on session data of the initial connectivity and on the initial symmetric key, and wherein the second token is based on the session data and on the authorizing credential; and executing a group-enrollment procedure interactively with the enrollee device, including verifying the limited-use credentials based on the trust relationship with the DR device and, in response to successful verification of the limited-use credentials, issuing a persistent group membership credential to the enrollee device.

20. The at least one non-transitory computer-readable medium of claim 19, further comprising:

instructions for establishing group connectivity parameters for the secure domain, including establishing a service set identifier (SSID) of at least one type of network through which a connection to the GA device is facilitated.

21. The at least one non-transitory computer-readable medium of claim 19, wherein the instructions for establishing the trust relationship between the DR device and the GA device include instructions for sharing a symmetric key with the DR device.

* * * * *

UNITED STATES PATENT AND TRADEMARK OFFICE
CERTIFICATE OF CORRECTION

PATENT NO.         : 10,575,273 B2                                    Page 1 of 1
APPLICATION NO.    : 15/087106
DATED              : February 25, 2020
INVENTOR(S)        : Zhao et al.

It is certified that error appears in the above-identified patent and that said Letters Patent is hereby corrected as shown below:

In the Claims

Column 21, Line 57, Claim 7, after "device", insert --of claim--

Column 21, Line 60, Claim 8, after "device", insert --of claim--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*